(12) United States Patent
Herrity (10) Patent No.: US 9,307,243 B2
(45) Date of Patent: Apr. 5, 2016

(54) METHOD AND APPARATUS FOR TRANSPORTING AN 8B/10B CODED VIDEO STREAM ACROSS A 64B/66B CODED LINK

(71) Applicant: Omron Management Center of America, Inc., Schaumburg, IL (US)

(72) Inventor: Kenneth Herrity, Milpitas, CA (US)

(73) Assignee: Omron Management Center of America, Inc., Hoffman Estates, IL (US)

( * ) Notice: Subject to any disclaimer, the term of this patent is extended or adjusted under 35 U.S.C. 154(b) by 0 days.

(21) Appl. No.: 14/197,706

(22) Filed: Mar. 5, 2014

(65) Prior Publication Data

US 2014/0205022 A1     Jul. 24, 2014

Related U.S. Application Data

(62) Division of application No. 13/136,251, filed on Jul. 27, 2011, now Pat. No. 8,705,633.

(60) Provisional application No. 61/400,144, filed on Jul. 28, 2010.

(51) Int. Cl.
    *H04N 7/12*       (2006.01)
    *G06F 11/00*      (2006.01)
    *H04N 19/89*      (2014.01)
    *H04N 21/4363*    (2011.01)

(52) U.S. Cl.
    CPC ......... *H04N 19/00933* (2013.01); *H04N 19/89* (2014.11); *H04N 21/43635* (2013.01)

(58) Field of Classification Search
    CPC ........ H04N 19/89; H04L 49/00; H04L 69/04; H04L 25/4908; H04L 12/413
    USPC ....................................... 375/240.25; 714/707
    See application file for complete search history.

(56) References Cited

U.S. PATENT DOCUMENTS

| 2001/0024457 A1 | 9/2001 | Barry et al. | |
| 2006/0256875 A1 | 11/2006 | McClellan | |
| 2007/0101241 A1* | 5/2007 | Hoyer | H04L 25/03866 714/776 |
| 2007/0234172 A1* | 10/2007 | Chiabrera | H04L 1/0043 714/752 |
| 2008/0109707 A1* | 5/2008 | Dell | H03M 13/03 714/776 |
| 2010/0070822 A1* | 3/2010 | Leung | H04L 1/0072 714/752 |
| 2011/0075683 A1* | 3/2011 | McClellan | H04L 1/0041 370/474 |

* cited by examiner

*Primary Examiner* — Dave Czekaj
*Assistant Examiner* — Tsion B Owens
(74) *Attorney, Agent, or Firm* — Murphy, Bilak & Homiller, PLLC (57) ABSTRACT

A video transport system is provided for transporting as 8B/10B coded video stream across a 64B/66B coded link, wherein forward error correction is provided without the overhead of the prior art. The system also provides a system with the ability to recover 64B/66B Encoded blocks that have corrupt Sync bits.

2 Claims, 11 Drawing Sheets

4B/8B Information Code

The 4B/8B Code is used to encode "Information Bytes" in 64B/66B Control Blocks. "Information Bytes" are any bytes in a Control Block that are not used to transport "Stream Data" or "Stream Control". "Information Bytes" are used to encode information about the stream. Each "Information Byte" represents one nibble (4-bit value) of information about the stream.

| Nibble Input | Information Byte Output Encoding |
|---|---|
| 0x0 | 0x00 |
| 0x1 | 0xe1 |
| 0x2 | 0xd2 |
| 0x3 | 0x33 |
| 0x4 | 0xb4 |
| 0x5 | 0x55 |
| 0x6 | 0x66 |
| 0x7 | 0x87 |
| 0x8 | 0x78 |
| 0x9 | 0x99 |
| 0xa | 0xaa |
| 0xb | 0x4b |
| 0xc | 0xcc |
| 0xd | 0x2d |
| 0xe | 0x1e |
| 0xf | 0xff |

Figure 1:
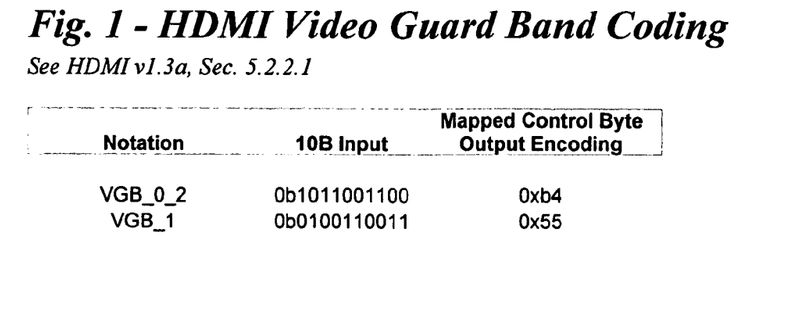

Fig. 1 - HDMI Video Guard Band Coding
See HDMI v1.3a, Sec. 5.2.2.1

| Notation | 10B Input | Mapped Control Byte Output Encoding |
|---|---|---|
| VGB_0_2 | 0b1011001100 | 0xb4 |
| VGB_1 | 0b0100110011 | 0x55 |

Figure 2:
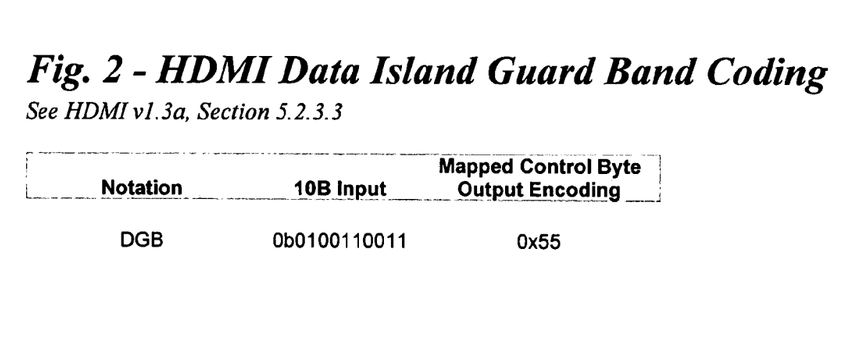

Fig. 2 - HDMI Data Island Guard Band Coding
See HDMI v1.3a, Section 5.2.3.3

| Notation | 10B Input | Mapped Control Byte Output Encoding |
|---|---|---|
| DGB | 0b0100110011 | 0x55 |

Figure 3:
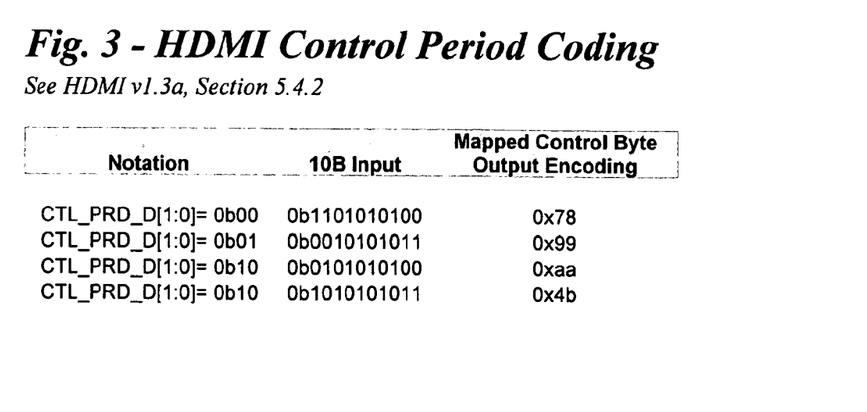

Fig. 3 - HDMI Control Period Coding
See HDMI v1.3a, Section 5.4.2

| Notation | 10B Input | Mapped Control Byte Output Encoding |
|---|---|---|
| CTL_PRD_D[1:0]= 0b00 | 0b1101010100 | 0x78 |
| CTL_PRD_D[1:0]= 0b01 | 0b0010101011 | 0x99 |
| CTL_PRD_D[1:0]= 0b10 | 0b0101010100 | 0xaa |
| CTL_PRD_D[1:0]= 0b10 | 0b1010101011 | 0x4b |

Figure 4:
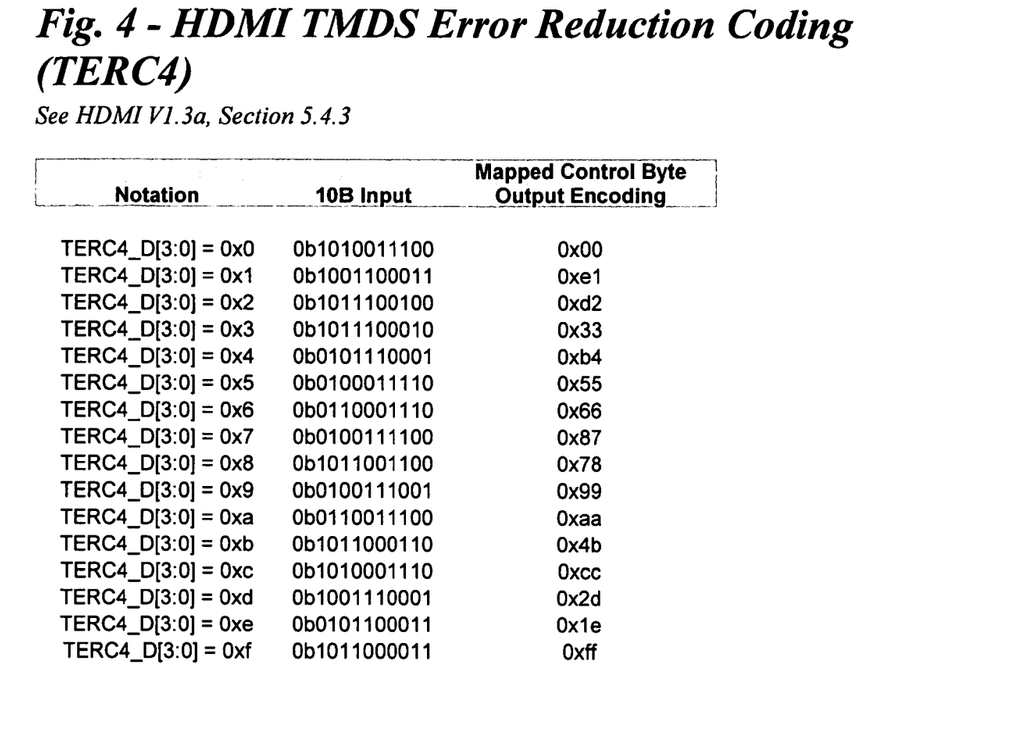

Fig. 4 - HDMI TMDS Error Reduction Coding (TERC4)

See HDMI V1.3a, Section 5.4.3

| Notation | 10B Input | Mapped Control Byte Output Encoding |
|---|---|---|
| TERC4_D[3:0] = 0x0 | 0b1010011100 | 0x00 |
| TERC4_D[3:0] = 0x1 | 0b1001100011 | 0xe1 |
| TERC4_D[3:0] = 0x2 | 0b1011100100 | 0xd2 |
| TERC4_D[3:0] = 0x3 | 0b1011100010 | 0x33 |
| TERC4_D[3:0] = 0x4 | 0b0101110001 | 0xb4 |
| TERC4_D[3:0] = 0x5 | 0b0100011110 | 0x55 |
| TERC4_D[3:0] = 0x6 | 0b0110001110 | 0x66 |
| TERC4_D[3:0] = 0x7 | 0b0100111100 | 0x87 |
| TERC4_D[3:0] = 0x8 | 0b1011001100 | 0x78 |
| TERC4_D[3:0] = 0x9 | 0b0100111001 | 0x99 |
| TERC4_D[3:0] = 0xa | 0b0110011100 | 0xaa |
| TERC4_D[3:0] = 0xb | 0b1011000110 | 0x4b |
| TERC4_D[3:0] = 0xc | 0b1010001110 | 0xcc |
| TERC4_D[3:0] = 0xd | 0b1001110001 | 0x2d |
| TERC4_D[3:0] = 0xe | 0b0101100011 | 0x1e |
| TERC4_D[3:0] = 0xf | 0b1011000011 | 0xff |

Figure 5:
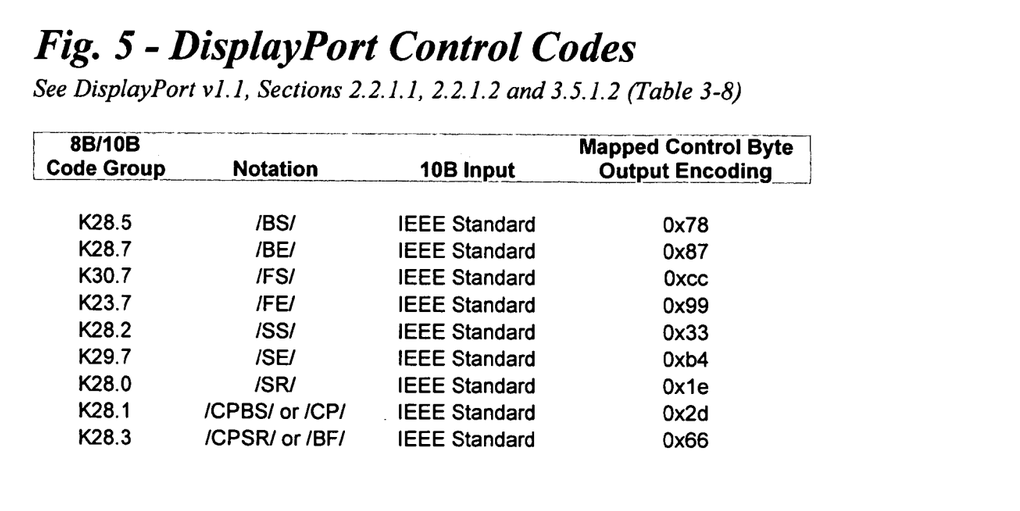

Fig. 5 - DisplayPort Control Codes

See DisplayPort v1.1, Sections 2.2.1.1, 2.2.1.2 and 3.5.1.2 (Table 3-8)

| 8B/10B Code Group | Notation | 10B Input | Mapped Control Byte Output Encoding |
|---|---|---|---|
| K28.5 | /BS/ | IEEE Standard | 0x78 |
| K28.7 | /BE/ | IEEE Standard | 0x87 |
| K30.7 | /FS/ | IEEE Standard | 0xcc |
| K23.7 | /FE/ | IEEE Standard | 0x99 |
| K28.2 | /SS/ | IEEE Standard | 0x33 |
| K29.7 | /SE/ | IEEE Standard | 0xb4 |
| K28.0 | /SR/ | IEEE Standard | 0x1e |
| K28.1 | /CPBS/ or /CP/ | IEEE Standard | 0x2d |
| K28.3 | /CPSR/ or /BF/ | IEEE Standard | 0x66 |

Figures 4B, 6:
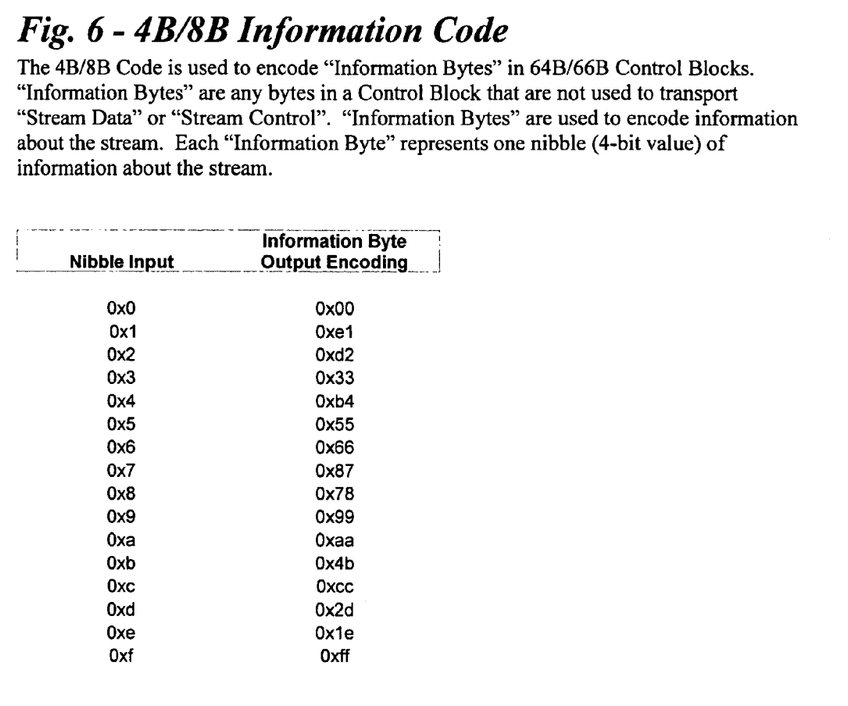

Fig. 6 - 4B/8B Information Code

The 4B/8B Code is used to encode "Information Bytes" in 64B/66B Control Blocks. "Information Bytes" are any bytes in a Control Block that are not used to transport "Stream Data" or "Stream Control". "Information Bytes" are used to encode information about the stream. Each "Information Byte" represents one nibble (4-bit value) of information about the stream.

| Nibble Input | Information Byte Output Encoding |
|---|---|
| 0x0 | 0x00 |
| 0x1 | 0xe1 |
| 0x2 | 0xd2 |
| 0x3 | 0x33 |
| 0x4 | 0xb4 |
| 0x5 | 0x55 |
| 0x6 | 0x66 |
| 0x7 | 0x87 |
| 0x8 | 0x78 |
| 0x9 | 0x99 |
| 0xa | 0xaa |
| 0xb | 0x4b |
| 0xc | 0xcc |
| 0xd | 0x2d |
| 0xe | 0x1e |
| 0xf | 0xff |

Figure 7:
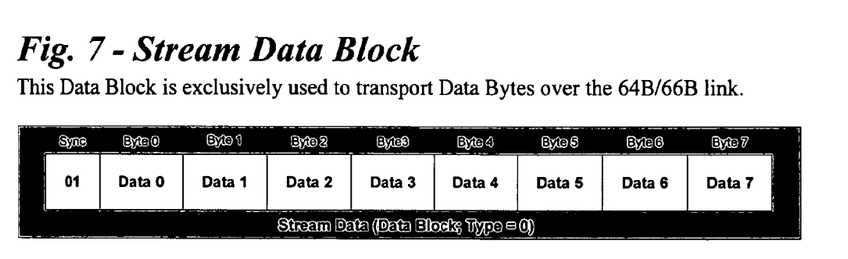

Fig. 7 - Stream Data Block

This Data Block is exclusively used to transport Data Bytes over the 64B/66B link.

Figure 8:
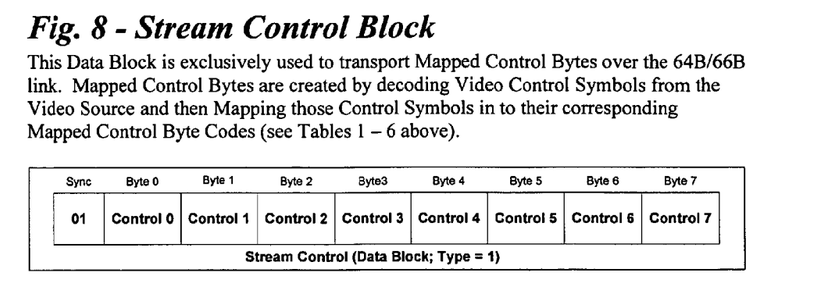

Fig. 8 - Stream Control Block

This Data Block is exclusively used to transport Mapped Control Bytes over the 64B/66B link. Mapped Control Bytes are created by decoding Video Control Symbols from the Video Source and then Mapping those Control Symbols in to their corresponding Mapped Control Byte Codes (see Tables 1 – 6 above).

| Sync | Byte 0 | Byte 1 | Byte 2 | Byte3 | Byte 4 | Byte 5 | Byte 6 | Byte 7 |
|---|---|---|---|---|---|---|---|---|
| 01 | Control 0 | Control 1 | Control 2 | Control 3 | Control 4 | Control 5 | Control 6 | Control 7 |
| Stream Control (Data Block; Type = 1) | | | | | | | | |

Figure 9:
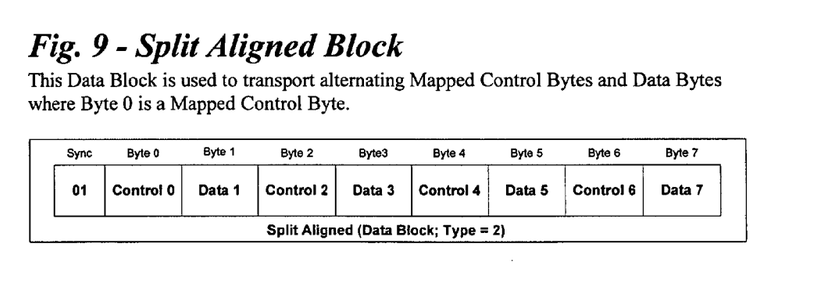

Fig. 9 - Split Aligned Block

This Data Block is used to transport alternating Mapped Control Bytes and Data Bytes where Byte 0 is a Mapped Control Byte.

| Sync | Byte 0 | Byte 1 | Byte 2 | Byte3 | Byte 4 | Byte 5 | Byte 6 | Byte 7 |
|---|---|---|---|---|---|---|---|---|
| 01 | Control 0 | Data 1 | Control 2 | Data 3 | Control 4 | Data 5 | Control 6 | Data 7 |
| Split Aligned (Data Block; Type = 2) | | | | | | | | |

Figure 10:
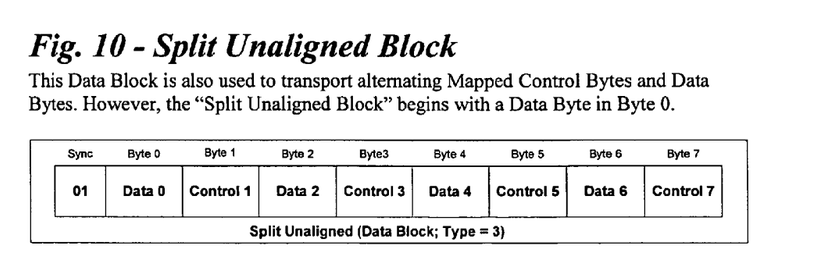

Fig. 10 - Split Unaligned Block

This Data Block is also used to transport alternating Mapped Control Bytes and Data Bytes. However, the "Split Unaligned Block" begins with a Data Byte in Byte 0.

| Sync | Byte 0 | Byte 1 | Byte 2 | Byte3 | Byte 4 | Byte 5 | Byte 6 | Byte 7 |
|---|---|---|---|---|---|---|---|---|
| 01 | Data 0 | Control 1 | Data 2 | Control 3 | Data 4 | Control 5 | Data 6 | Control 7 |
| Split Unaligned (Data Block; Type = 3) | | | | | | | | |

Figure 11:
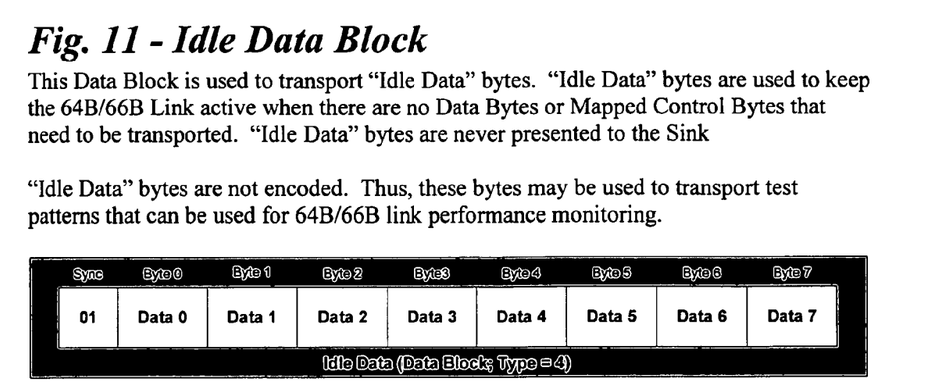

Fig. 11 - Idle Data Block

This Data Block is used to transport "Idle Data" bytes. "Idle Data" bytes are used to keep the 64B/66B Link active when there are no Data Bytes or Mapped Control Bytes that need to be transported. "Idle Data" bytes are never presented to the Sink "Idle Data" bytes are not encoded. Thus, these bytes may be used to transport test patterns that can be used for 64B/66B link performance monitoring.

| Sync | Byte 0 | Byte 1 | Byte 2 | Byte 3 | Byte 4 | Byte 5 | Byte 6 | Byte 7 |
|------|--------|--------|--------|--------|--------|--------|--------|--------|
| 01   | Data 0 | Data 1 | Data 2 | Data 3 | Data 4 | Data 5 | Data 6 | Data 7 |
| Idle Data (Data Block; Type = 4) ||||||||||

Figure 12:
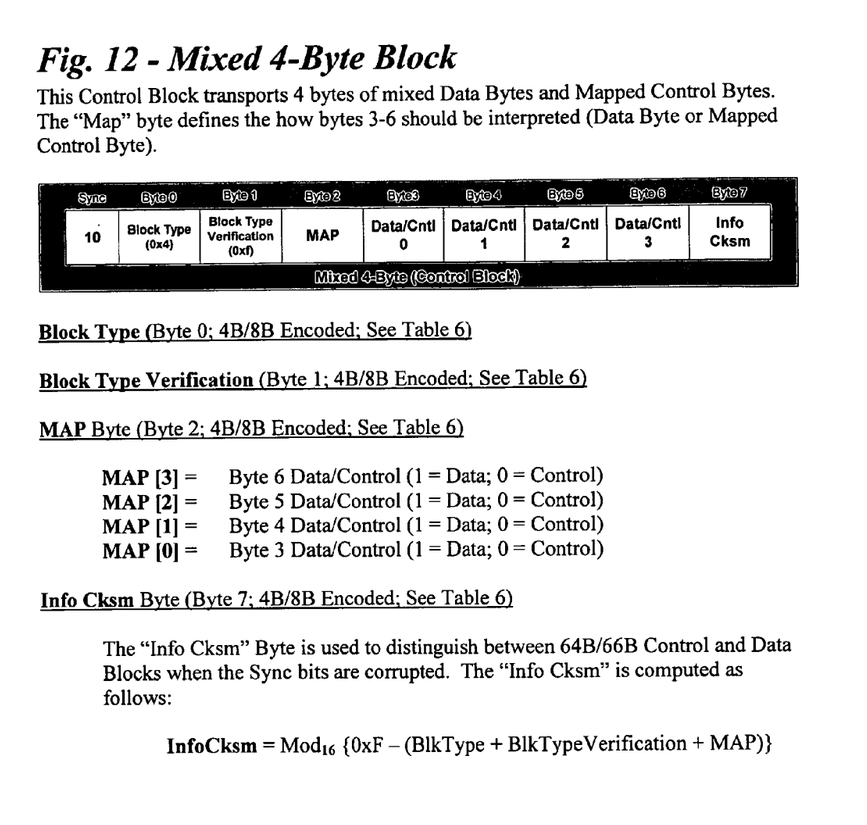

Fig. 12 - Mixed 4-Byte Block

This Control Block transports 4 bytes of mixed Data Bytes and Mapped Control Bytes. The "Map" byte defines the how bytes 3-6 should be interpreted (Data Byte or Mapped Control Byte).

| Sync | Byte 0 | Byte 1 | Byte 2 | Byte 3 | Byte 4 | Byte 5 | Byte 6 | Byte 7 |
|---|---|---|---|---|---|---|---|---|
| 10 | Block Type (0x4) | Block Type Verification (0xf) | MAP | Data/Cntl 0 | Data/Cntl 1 | Data/Cntl 2 | Data/Cntl 3 | Info Cksm |

Mixed 4-Byte (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

MAP [3] =   Byte 6 Data/Control (1 = Data; 0 = Control)
    MAP [2] =   Byte 5 Data/Control (1 = Data; 0 = Control)
    MAP [1] =   Byte 4 Data/Control (1 = Data; 0 = Control)
    MAP [0] =   Byte 3 Data/Control (1 = Data; 0 = Control)

Info Cksm Byte (Byte 7; 4B/8B Encoded; See Table 6)

The "Info Cksm" Byte is used to distinguish between 64B/66B Control and Data Blocks when the Sync bits are corrupted. The "Info Cksm" is computed as follows:

InfoCksm = Mod$_{16}$ {0xF − (BlkType + BlkTypeVerification + MAP)}

Figure 13:
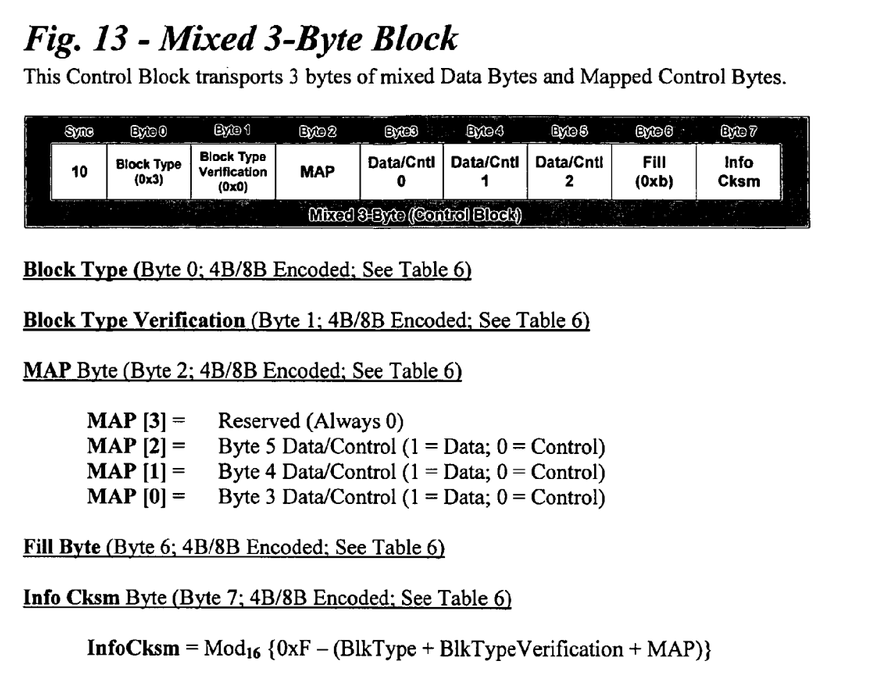

Fig. 13 - Mixed 3-Byte Block

This Control Block transports 3 bytes of mixed Data Bytes and Mapped Control Bytes.

| Sync | Byte 0 | Byte 1 | Byte 2 | Byte 3 | Byte 4 | Byte 5 | Byte 6 | Byte 7 |
|---|---|---|---|---|---|---|---|---|
| 10 | Block Type (0x3) | Block Type Verification (0x0) | MAP | Data/Cntl 0 | Data/Cntl 1 | Data/Cntl 2 | Fill (0xb) | Info Cksm |

Mixed 3-Byte (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

MAP [3] =    Reserved (Always 0)
    MAP [2] =    Byte 5 Data/Control (1 = Data; 0 = Control)
    MAP [1] =    Byte 4 Data/Control (1 = Data; 0 = Control)
    MAP [0] =    Byte 3 Data/Control (1 = Data; 0 = Control)

Fill Byte (Byte 6; 4B/8B Encoded; See Table 6)

Info Cksm Byte (Byte 7; 4B/8B Encoded; See Table 6)

InfoCksm = $\text{Mod}_{16}$ {0xF − (BlkType + BlkTypeVerification + MAP)}

Figure 14:
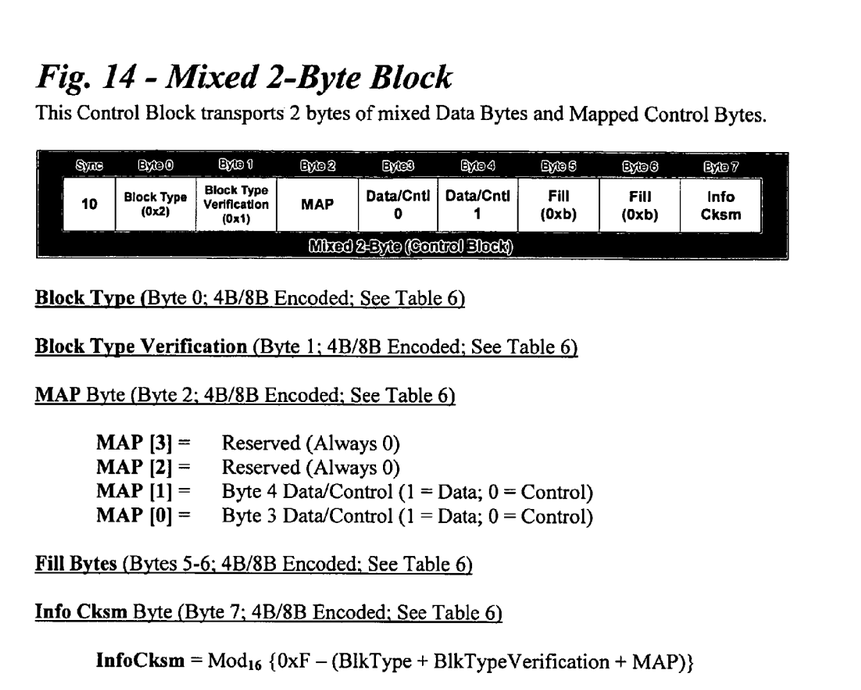

Fig. 14 - Mixed 2-Byte Block

This Control Block transports 2 bytes of mixed Data Bytes and Mapped Control Bytes.

| Sync | Byte 0 | Byte 1 | Byte 2 | Byte 3 | Byte 4 | Byte 5 | Byte 6 | Byte 7 |
|------|--------|--------|--------|--------|--------|--------|--------|--------|
| 10 | Block Type (0x2) | Block Type Verification (0x1) | MAP | Data/Cntl 0 | Data/Cntl 1 | Fill (0xb) | Fill (0xb) | Info Cksm |
| Mixed 2-Byte (Control Block) | | | | | | | | |

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

MAP [3] =     Reserved (Always 0)
    MAP [2] =     Reserved (Always 0)
    MAP [1] =     Byte 4 Data/Control (1 = Data; 0 = Control)
    MAP [0] =     Byte 3 Data/Control (1 = Data; 0 = Control)

Fill Bytes (Bytes 5-6; 4B/8B Encoded; See Table 6)

Info Cksm Byte (Byte 7; 4B/8B Encoded; See Table 6)

InfoCksm = $Mod_{16}$ {0xF − (BlkType + BlkTypeVerification + MAP)}

Figure 15:
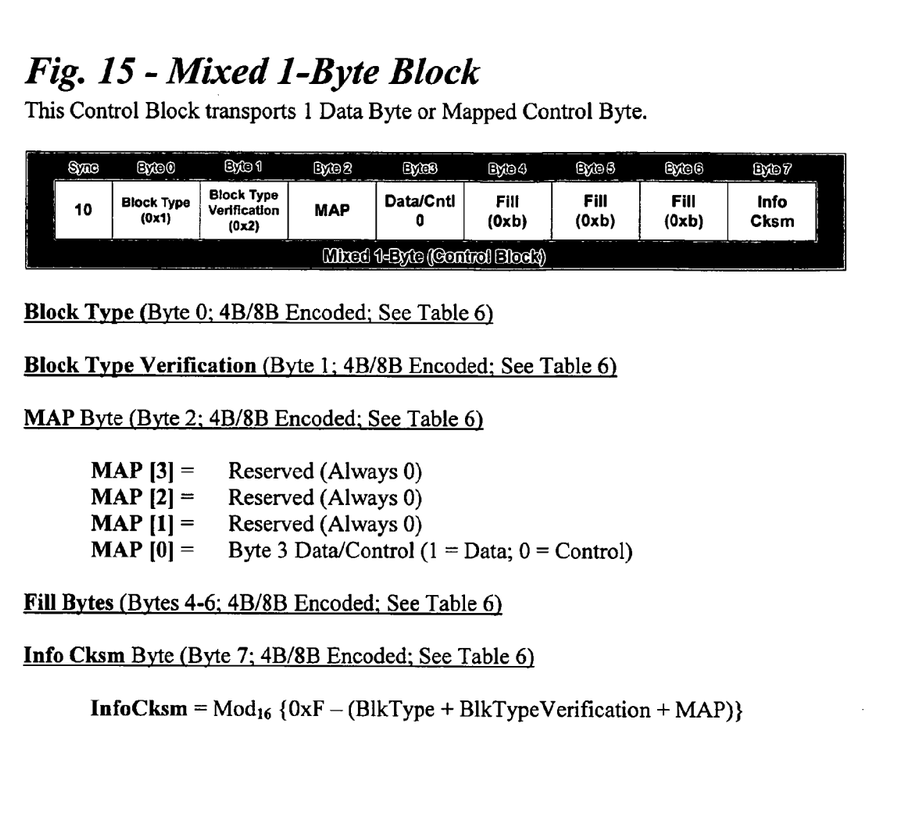

Fig. 15 - Mixed 1-Byte Block

This Control Block transports 1 Data Byte or Mapped Control Byte.

| Sync | Byte 0 | Byte 1 | Byte 2 | Byte 3 | Byte 4 | Byte 5 | Byte 6 | Byte 7 |
|---|---|---|---|---|---|---|---|---|
| 10 | Block Type (0x1) | Block Type Verification (0x2) | MAP | Data/Cntl 0 | Fill (0xb) | Fill (0xb) | Fill (0xb) | Info Cksm |

Mixed 1-Byte (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

MAP [3] =   Reserved (Always 0)
    MAP [2] =   Reserved (Always 0)
    MAP [1] =   Reserved (Always 0)
    MAP [0] =   Byte 3 Data/Control (1 = Data; 0 = Control)

Fill Bytes (Bytes 4-6; 4B/8B Encoded; See Table 6)

Info Cksm Byte (Byte 7; 4B/8B Encoded; See Table 6)

InfoCksm = $Mod_{16}$ {0xF − (BlkType + BlkTypeVerification + MAP)}

Figure 16:
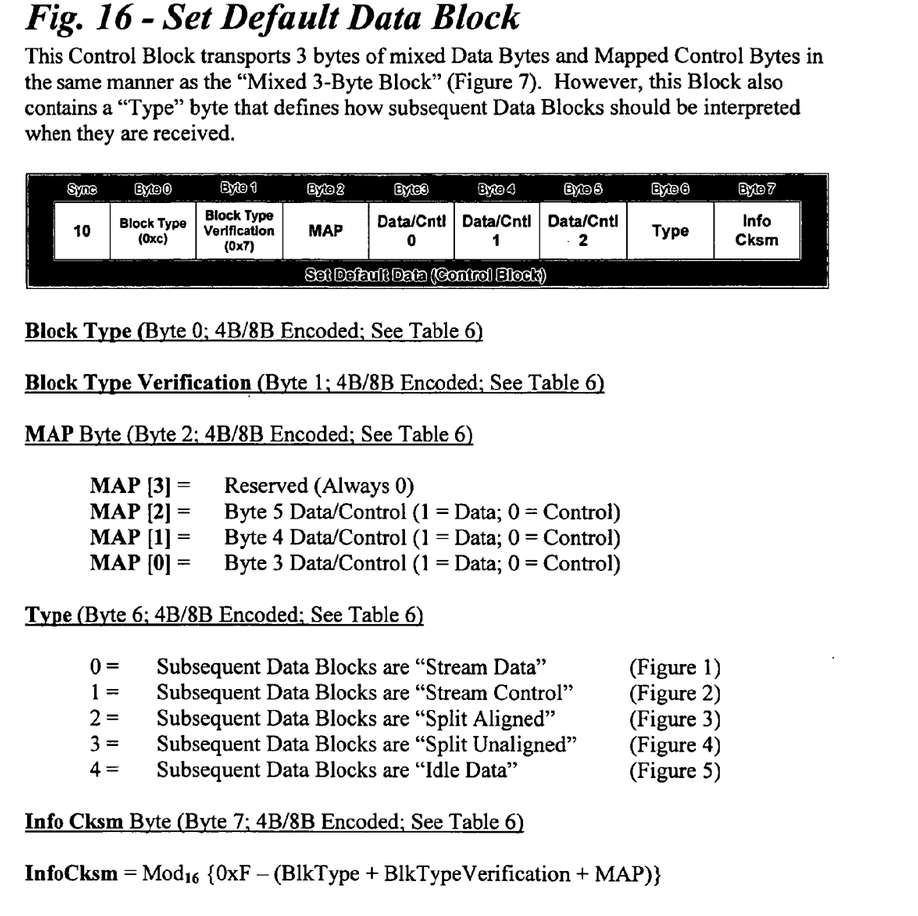

Fig. 16 - Set Default Data Block

This Control Block transports 3 bytes of mixed Data Bytes and Mapped Control Bytes in the same manner as the "Mixed 3-Byte Block" (Figure 7). However, this Block also contains a "Type" byte that defines how subsequent Data Blocks should be interpreted when they are received.

Set Default Data (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

MAP [3] =    Reserved (Always 0)
    MAP [2] =    Byte 5 Data/Control (1 = Data; 0 = Control)
    MAP [1] =    Byte 4 Data/Control (1 = Data; 0 = Control)
    MAP [0] =    Byte 3 Data/Control (1 = Data; 0 = Control)

Type (Byte 6; 4B/8B Encoded; See Table 6)

0 =    Subsequent Data Blocks are "Stream Data"    (Figure 1)
    1 =    Subsequent Data Blocks are "Stream Control"    (Figure 2)
    2 =    Subsequent Data Blocks are "Split Aligned"    (Figure 3)
    3 =    Subsequent Data Blocks are "Split Unaligned"    (Figure 4)
    4 =    Subsequent Data Blocks are "Idle Data"    (Figure 5)

Info Cksm Byte (Byte 7; 4B/8B Encoded; See Table 6)

InfoCksm = $\text{Mod}_{16}$ {0xF − (BlkType + BlkTypeVerification + MAP)}

*Fig. 17 Schematic Representation of the environment of the invention*

METHOD AND APPARATUS FOR TRANSPORTING AN 8B/10B CODED VIDEO STREAM ACROSS A 64B/66B CODED LINK

RELATED APPLICATIONS

This application claims priority under 35 U.S.C. 120 as a divisional application of U.S. application Ser. No. 13/136,251, which has a filing date of 27 Jul. 2011, and which claims benefit of U.S. Provisional Application No. 61/400,444, which has a filing date of 28 Jul. 2010.

BACKGROUND

A video system can tolerate a relatively high pixel error rate without noticeably degrading the displayed video image. Pixel errors will manifest as sparkles that will be mostly un-noticeable in the displayed image.

However, video control errors may corrupt the entire displayed frame and may also corrupt the output audio. Thus, even a relatively small number of errors can result in noticeable image flickering and audible bursts of noise. Consequently, video control symbol errors must be prevented while video data symbol errors may be tolerated.

Most forward error correction schemes focus on protecting the entire data stream. This approach adds between 7% and 10% overhead to the data stream and requires logic that is large and complex.

In 64B/66B, prior art forward error control is inherently incapable of protecting sync bits, i.e. the prior art is unable to correct sync bits. While the prior art may be able to detect that a sync bit error occurred, it will not be able to determine how to correct the error. This failure will cause the entire 66B coded word to be lost or corrupted.

The disclosed invention provides effective protection for video control without introducing either the overhead or complexity associated with traditional forward error correction schemes.

BRIEF SUMMARY OF INVENTION

As shown and described below, the present invention increases the efficiency of the link by providing forward error correction without introducing the overhead or complexity of prior art forward error correction schemes such as Reed-Solomon.

The present invention also provides, for the first time known to applicant, a system having the ability to recover 64B/66B Encoded 'Blocks that have corrupt "Sync" bits.

Prior art for video transport over 64B/66B coded links, such as RTP (Real Time Transport Protocol) involve packing the video information into RTP Data packets and RTCP Control Packets and then transporting those packets across a network using the Internet Protocols defined by the Internet Engineering Task Force (IETF). These RTP and TRCP packets must be unpacked at the receiver in order to recreate the original video stream. RTP does not teach how to transport 8B/10B Video Data at the byte/symbol level without the complexity and overhead of segmenting the Video stream in to Packets, inserting packet headers for RTP and any other Routing and Link Layer protocol used for physical packet transport, and then stripping those packet headers from the RTP packets at the receiver so that the original Video Stream can be reassembled from the transmitted packet segments.

Prior art for transporting standard Ethernet 8B/10B symbols over a 64B/66B Link (such as IEEE Standard 802.3-2005 Section 49) does not teach how to transport 8B/10B video symbols that do not comply with the Ethernet Standard (such as 8B/10B symbols disclosed in the "High Definition Multimedia Interface Specification" Version 1.3a, Section 5). This prior art also does not teach how to protect the 8B/10B coded Video Control information without adding the 7% to 10% overhead associated with the traditional FEC scheme.

The present invention provides, for the first time known to applicant, a system having the ability to transport 8B/10B coded video streams over a 64B/66B link such that the 8B/10B Video Streams do not have to be packed or recoded using a Transport Layer Protocol (such as RTP) and such that non-standard 8B/10B Video Symbols may be directly transported on the 64B/66B link while retaining the ability to detect and correct all Video Control symbol errors.

BRIEF DESCRIPTION OF THE DRAWINGS

FIG. 1 HDMI Video Guard Band Coding
FIG. 2 HDMI Data Island Guard Band Coding
FIG. 3 HDMI Control Period Coding
FIG. 4 HDMI TMDS Error Reduction Coding (TERC4)
FIG. 5 Display Port Control Codes
FIG. 6 4B/8B information Code
FIG. 7 Stream Data Block (64B/66B Data Block)
FIG. 8 Stream Control Block (64B/66B Data Block)
FIG. 9 Split Aligned Block (64B/66B Data Block)
FIG. 10 Split Unaligned Block (64B/66B Data Block)
FIG. 11 Idle Data Block (64B/66B Data Block)
FIG. 12 Mixed 4-Byte Block (64B/66B Control Block)
FIG. 13 Mixed 3-Byte Block (64B/66B Control Block)
FIG. 14 Mixed 2-Byte Block (64B/66B Control Block)
FIG. 15 Mixed 1-Byte Block (64B/66B Control Block)
FIG. 16 Set Default data Block (64B/66B Control Block)
FIG. 17 A schematic representation of the environment of the invention

DETAILED DESCRIPTION OF THE DRAWINGS

The invention protects the 8B/10B control symbols in a video stream as follows:

1. A Video Source sends an 8B/10B input video stream to a Transmitter according to this invention.

2. The Transmitter decodes the 8B/10B input video stream such that each 10B symbol is represented as a byte with an associated flag that indicates whether or not the decoded 10B symbol was a Control Byte or Data Byte.

3. The Transmitter translates the Control Bytes into unique mapped Control Bytes that have a Hamming distance of 3 or more. This allows for single bit error correction on each Mapped Control Byte. This is possible because the number of unique Control Bytes in a video stream is small. See FIGS. 1-5 for examples of how Video Control Symbols can be translated into protected Mapped Control Bytes.

4. The Transmitter packs the decoded Data Bytes and the Mapped Control Bytes (in the order received) into an appropriate 64B/66B Data Block "Type". The transmitter selects the Data Block "Type" based on the mix of Data Bytes and mapped Control Bytes that need to be transmitted. See FIGS. 7-10 for some examples of pre-defined Data Block "Types".

5. The Transmitter uses a 64B/66B Control Block (see FIG. 16; "Set Default Data Block") to inform the Receiver which Data Block "Type" to expect. The Transmitter only needs to select a new Data Block Type when the mix of Data Bytes and Mapped Control Bytes changes.

6. The Transmitter sends "Idle Data" Data Blocks (see FIG. 11) to the Receiver when the Transmitter has no new Video Data from the Video Source. The Receiver does not decode or forward Idle Data to the Video Sink.

7. The Transmitter packs Data Bytes and Mapped Control Bytes into an appropriate 64B/66B Control Block (instead of a Data Block) when there are less than 8 Video Bytes that need to be transmitted or when the mix of Data Bytes and Mapped Control Bytes does not match any of the pre-defined Data Block "Types".

8. In order to achieve maximum 64B/66B efficiency, the Transmitter uses a 64B/66B Data Block whenever possible and only uses a 64B/66B Control Block when necessary.

9. The Transmitter places 4B/8B Information Bytes (see FIG. 6) in Control Blocks to identify the Control Block, map the location of Data/Control Bytes, select the next Data Block "Type" and encode redundant information (used to identify Control Blocks when the Sync Bits are corrupt).

10. The Transmitter packs redundant information in the 64B/66B Control Blocks to make it possible for the Receiver to reliably distinguish between 64B/66B Control and Data Blocks when the 64B/66B Sync bits are corrupted. In the event of Sync Bit corruption (Sync=0b00 or 0b11), the Receiver checks the block format and verifies the redundant information. If the block format and redundant information are consistent with a valid Control Block, then the Receiver interprets the 64B/66B Block with corrupt Sync bits as a Control Block. Otherwise, the Receiver interprets the 64B/66B Block as a Data Block. See FIGS. 12-16 for examples of Control Blocks with redundant information.

11. The Transmitter transmits the 64B/66B blocks to the Receiver

12. The Receiver receives the 64B/66B stream and then decodes the Control Blocks and Data Blocks disclosed above to correct any errors in the Mapped Control Bytes and then recreates the original 8B/10B stream with both the same order and number of symbols that were presented to the Transmitter.

The receiver then sends the reconstructed 8B/10B stream to the Video Sink.

As used herein:

HDMI is an acronym for "High Definition Multi-Media Interface"

TMDS is an acronym for "Transition Minimized Differential Signaling"

TERC4 is an acronym for "TMDS Error Reduction Coding 4 bit"

Figure 17:
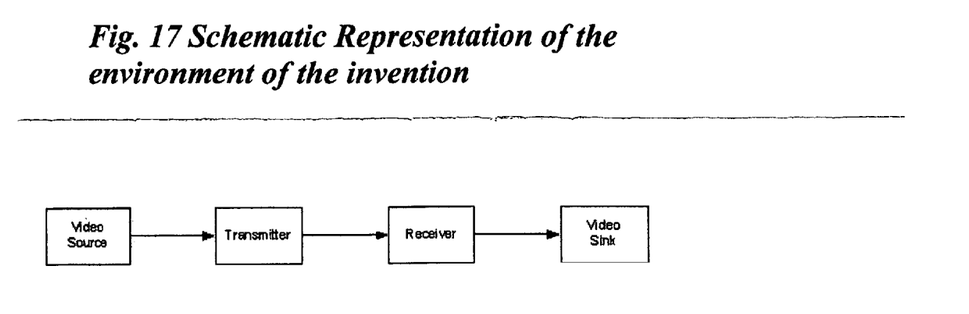

FIG. 17 is a schematic representation of the environment of the invention, illustrating the relationship of a video source, transmitter, receiver and video sink relative to each other.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

The invention claimed is:

1. A method for transporting an 8B/10B coded video stream from a transmitter across a 64B/66B coded link to a receiver, the method comprising:

decoding the 8B/10B coded video stream and thereby obtaining a stream of control bytes and data bytes corresponding to the 8B/10B coded video stream;

when a mix of control and data bytes in the stream corresponds to a predefined data block type from among a number of predefined data block types corresponding to different mixes of control and data bytes, using 64B/66B data blocks to forward the stream towards the receiver, and when the mix of control and data bytes in the stream does not correspond to one of the predefined data block types, using 64B/66B control blocks to forward the stream towards the receiver; and for each 64B/66B control block sent from the transmitter to the receiver, using one or more 4B/8B information bytes in the 64B/66B control block to:

to map the location of data bytes and control bytes in the 64B/66B control block, indicate the next predefined data block type to be sent from the transmitter to the receiver, and pack redundant information in the 64B/66B control block, to enable the receiver to recognize the 64B/66B control block as being a 64B/66B control block even when synchronization bits in the 64B/66B control block are received in error at the receiver.

2. The method of claim 1, wherein the 4B/8B information bytes are coded with an arbitrary code that has a Hamming distance of 3 or more to allow error detection and correction in the 4B/8B information bytes.

* * * * *